United States Patent [19]

Zumbe et al.

[11] Patent Number: 5,501,865
[45] Date of Patent: Mar. 26, 1996

[54] MILK CHOCOLATE AND METHOD OF MAKING SAME

[75] Inventors: Albert Zumbe, Neuchatel, Switzerland; Anne-Marie Bade, Waldenburch, Germany

[73] Assignee: Jacobs Suchard AG, Waldenburch, Germany

[21] Appl. No.: 140,055

[22] PCT Filed: Apr. 10, 1992

[86] PCT No.: PCT/GB92/00657

§ 371 Date: Oct. 29, 1993

§ 102(e) Date: Oct. 29, 1993

[87] PCT Pub. No.: WO92/19112

PCT Pub. Date: Nov. 12, 1992

[30] Foreign Application Priority Data

Apr. 30, 1991 [GB] United Kingdom ............ 9109251
Sep. 25, 1991 [GB] United Kingdom ............ 9120449

[51] Int. Cl.[6] .................................................. A23G 1/00
[52] U.S. Cl. .................................... 426/548; 426/660
[58] Field of Search .................................... 426/660, 548

[56] References Cited

U.S. PATENT DOCUMENTS

| | | | |
|---|---|---|---|
| 4,011,349 | 3/1977 | Riesen . | |
| 4,810,516 | 3/1989 | Kong-Chang | 426/548 |
| 5,017,400 | 5/1991 | Olinger | 426/548 |
| 5,223,303 | 6/1993 | Taskinen | 426/548 |
| 5,264,228 | 11/1993 | Pray | 426/548 |
| 5,266,348 | 11/1993 | Zumbe | 426/548 |
| 5,360,621 | 11/1994 | Mentink | 426/548 |

FOREIGN PATENT DOCUMENTS

| | | |
|---|---|---|
| 0140729A1 | 5/1985 | European Pat. Off. . |
| 0285187A1 | 10/1988 | European Pat. Off. . |
| 0317917A3 | 5/1989 | European Pat. Off. . |
| 0377278A3 | 11/1989 | European Pat. Off. . |
| 3129892A1 | 6/1982 | Germany . |
| 3512764A1 | 11/1985 | Germany . |
| 677429A5 | 5/1991 | Switzerland . |

OTHER PUBLICATIONS

Hartmut Bolligen and Thomas Keme "How To Make Sucrose–Free Chocolate" *Zucker–Und Susswaren Wirthschaft* vol. 1 (Jan. 1988): H 7528 E.

*Primary Examiner*—Carolyn Paden
*Attorney, Agent, or Firm*—Joyce P. Hill; Thomas A. Marcoux

[57] ABSTRACT

The present invention relates to milk chocolate and a method of making the same which is capable of having a calorie content less than that of conventional milk chocolate. The invention provides a milk chocolate composition made from the admixture of cocoa, milk and a sweetener, wherein the cocoa component comprises cocoa butter and cocoa powder, the milk component comprises low fat milk powder and butterfat, and the sweetener component comprises a sugar alcohol, wherein the total fat content of the composition is less than about 30% by weight, of which at least 75% by weight is made up of the aggregate of the cocoa butter and butterfat. The milk chocolate can be made from this composition by intimately mixing together the cocoa, milk and sweetener components at a temperature of less than 60° C.

20 Claims, No Drawings

MILK CHOCOLATE AND METHOD OF MAKING SAME

The present invention relates to milk chocolate and a method of making the same which is capable of having a calorie content less than that of conventional milk chocolate.

BACKGROUND OF THE INVENTION

In the light of current concern about the calorie content of foodstuffs and also about the proportion of fat and sugar therein, a number of lower calorie versions of conventional foodstuffs have been developed in which the fat content has been lowered and sugar has been replaced in whole or in part by alternative sweeteners such as the so-called "intense sweeteners": aspartame, saccharin, acesulphame K, and the like. A desirable goal is a reduction in calorie content by 25% or even more. Sugar-free foodstuffs have also been developed for diabetics and to try to reduce the occurrence of caries in teeth.

A particular problem exists, however, with milk chocolate in that legally to qualify as such it must contain at least 25% fat. (All of the percentages mentioned herein are by weight unless otherwise stated.) A typical conventional milk chocolate contains about 31% fat and has a calorie content of about 530 kcal per 100 grams. Thus a reduction to a 25% fat content, with the 6% saving being compensated for by an increase in carbohydrate content, reduces the calorie content by only about 30 kcal per 100 grams, i.e. only about a 5.7% reduction. It is clear that the sugar which forms some 45–50% of conventional milk chocolate will need to be replaced by a lower calorie ingredient in order to reach the desired 25% calorie reduction.

Sugar-free chocolate for diabetics has long been known wherein sugar is replaced by sorbitol. Unfortunately sorbitol has the same calorie content as sugar and so no energy saving ensues from its use.

However the sugar alcohols similar to sorbitol such as isomalt, lactitol, maltitol, etc. which have been recently permitted in foodstuffs have calorie contents of only about 60% that of sugar and examples of sugar-free milk chocolate compositions incorporating such alternatives are described in EP-A-0317917 and a related article by Hartmut Bollinger and Thomas Keme entitled "How to make sucrose-free chocolate" published in Zucher-und Susswaren Wirtschaft in January 1988. Although the described compositions are based on isomalt which has a low calorie content, the fat content of the described compositions is of the order of 35%, which is higher than for conventional sugar-based milk chocolate. One reason for this is that the viscosity of chocolate during its manufacture and processing increases when sugar alcohols are used in place of sugar and this is usually compensated for by the use of additional fat.

In order to reduce the calorie content of milk chocolate significantly, particularly by at least 25% so as to justify the designation "lower calorie", not only should the chocolate be essentially free from sugar, but also it should have a lower fat content than conventional sugar-based milk chocolate. Heretofore, however, it has been considered not to be possible to produce a milk chocolate not based on sugar and having a fat content of less than about 30% which is satisfactory as regards its taste, texture and mouthfeel. These physiological properties are developed chiefly during the chocolate's so-called "conching" stage in which the ingredients are subjected to an extended period of intimate grinding and mixing with access to air in order to allow undesirable aromatic components to volatilize. Although the processes that go on during conching are poorly understood, it is conventional wisdom that there should be enough fat in the composition to coat all of the other ingredients and that the conching temperature should be sufficiently high to drive off all of the undesired components in a reasonable time.

Furthermore for a milk chocolate composition not based on sugar the total amount of sugar-replacing components is generally greater than the amount of sugar used in a sugar-based milk chocolate composition, and therefore it has heretofore been assumed that the fat content of such a chocolate should similarly be high, resulting in a high calorie content thereby limiting the scope for calorie reduction.

SUMMARY OF THE INVENTION

It has now unexpectedly been found that the use of a sugar alcohol coupled with a relatively high proportion of the total amount of cocoa butter and butterfat in the chocolate composition and a relatively low total fat content, not only produces a milk chocolate with an acceptable flavour, texture and mouthfeel, but also permits the chocolate's calorie content to be reduced significantly as compared with conventional milk chocolate compositions, particularly those based on sugar, as discussed below.

DESCRIPTION OF THE PREFERRED EMBODIMENTS

In accordance with the present invention there is provided a milk chocolate composition made from the admixture of cocoa, milk and a sweetener, wherein the cocoa component comprises cocoa butter and cocoa powder, the milk component comprises low fat milk powder and butterfat, and the sweetener component comprises a sugar alcohol, wherein the total fat content of the composition is less than about 30% by weight, of which at least 75% by weight is made up of the aggregate of the cocoa butter and butterfat.

By replacing the cocoa liquor and milk powders conventionally used in milk chocolate by low-fat equivalents it has enabled the inventors not only to reduce the total fat content to less than that of conventional milk chocolate, but also to use cocoa butter and butterfat in a combined amount sufficient to coat substantially all of the ingredients during the conching stage and thereby achieve an acceptable milk chocolate. By the term "low fat" as used herein is meant containing less than 5% by weight of metabolisable fat.

In its preferred embodiment, the total fat content of the chocolate composition of the present invention is approximately 25%, of which at least 80% is made up by the aggregate of cocoa butter and butterfat. The ratio of cocoa butter to butterfat in the composition has not been found to be critical, but it is preferred that it should be in the range of from about 2:1 to about 5.5:1, more preferably about 3.4:1. Furthermore, although conventional cocoa powder can be used, it is preferred to use low fat cocoa powder to help reduce even further the total calorie content.

Recently certain edible carbohydrates, sometimes called bulking agents, have been approved for food use which have a relatively low metabolisable calorie content. These consist of easily metabolised sugars like glucose and fructose linked together to form polymers by bonds which cannot be split by enzymes in the human body. These carbohydrates are thus only partially metabolised and can therefore have calorie contents which are lower than that of sugar. Three such carbohydrates are polydextrose, oligofructose and inulin.

Polydextrose is a randomly bonded condensation polymer of D-glucose having an upper molecular weight limit typically exceeding 22,000, while oligofructose consists of a mixture of polymers of fructose with a much lower degree of polymerisation, the majority being from two to five fructose units. Inulin is a naturally occuring polysaccharide of Compositae consisting essentially of polyfructose of molecular weight about 5000. Of these three compounds polydextrose is currently preferred because it is more widely accepted by regulatory authorities and its calorie content is more firmly established. It has been found, however, that its inclusion in conventional sugar-free milk chocolate compositions degrades the texture and mouthfeel of the resultant chocolate.

It has now been surprisingly found that a bulking agent can be added to the composition of the present invention to reduce its calorie content without significantly adversely affecting its quality or processability. Preferably the composition of the present invention has a calorie content of less than 530 kcal per 100 grams, and is preferably less than 400 kcal per 100 grams in order to provide at least a 25% calorie reduction on regular milk chocolate, with polydextrose being the preferred bulking agent. Using oligofructose, a calorie reduction of 30% or greater can be achieved.

There are other food ingredients that are sources of dietary fibre that have zero energy according to Regulators in some countries. Additions of such ingredients would further reduce the calorie content of the compositions of the invention. Typical of such ingredients are cereal fibres, vegetable fibres, cellulose particularly microcrystalline cellulose, pectins and edible gums. From a compositional point of view the most suitable for the present invention is cocoa fibre.

If in view of the reduced sweetness of the polydextrose and sugar alcohol components it is required to increase the overall sweetness of the finished milk chocolate, then one of the known intense sweeteners such as aspartame or acesulphame K can be used. In addition, the composition can include at least one emulsifier and flavouring agent, and any other ingredient conventionally used in milk chocolate compositions. More than one sugar alcohol can be used if desired, and one very suitable emulsifier that can be used is lecithin.

It will be appreciated that in view of the use of polydextrose and a sugar alcohol, the temperature during conching should be kept at a level below that at which the water of crystallisation inherently present in these ingredients is released in order to avoid any undesirable increase in viscosity or agglomeration of the mixture. Conching should therefore generally take place at less than 60° C. and below 45° C. when isomalt or maltitol are used as the sugar alcohol component. Despite the teaching in the standard reference work "Chocolate, Cocoa and Confectionery" by A. Minifie that temperatures of up to 70° C. should be used for milk chocolate when, as in the invention, low-fat skim milk powder plus butterfat is used instead of full fat milk powder, it has nevertheless been surprisingly found that even at these relatively low temperatures conching in the traditional manner is capable of yielding satisfactory milk chocolate in a reasonable length of time, typically between 6 and 18 hours. During the refining and conching stages of the manufacture of the present chocolate, steps should be taken to avoid any significant absorption of moisture in view of the hygroscopic nature of the sugar alcohols used.

In recent times the use of extrusion cookers has been advocated for replacing part of all of the traditional conching operation. Single screw and twin screw extruders are available and capable of the same mechanical operations, but because of their greater flexibility twin screw extruders have usually been preferred. For example U.S. Pat. No. 4,713,256 proposed a twin screw extruder in replacement of the traditional conche. With careful control of the operating temperature of such an extruder it has been found possible successfully to conche the composition of the present invention, provided that the extruder is modified to avoid the ingress of moisture whilst at the same time allowing undesired aromatic components to volatilize. In accordance with a preferred embodiment of the present invention the mixing is effected continuously in a rotary extruder which includes means for controlling the temperature of the mixture being extruded therethrough, means for removing gasses from the mixture during extrusion, and means for preventing the ingress of moisture during extrusion.

Following the teaching of U.S. Pat. No. 4,713,256, the ingredients can be subjected sequentially to both dry and liquid conching separated by a degassing stage, but in the course of researching the behaviour of the compositions of the present invention in such a twin screw extruder, it has been unexpectedly and significantly discovered that the conventional dry conching stage, which has always been considered to be essential, can in fact be eliminated. Thus rather than introducing a proportion of the fat components at the initial conching stage, all of them can be added at the start of the conching process without adversely affecting the quality of the milk chocolate produced.

It has further been demonstrated that reduced calorie chocolate as described in this invention can be successfully manufactured using a one-step continuous chocolate refiner/conche such as that known as the Macintyre Model Al.

In the course of researching the processing of lower calorie milk chocolate it was found to be advantageous in some instances to refine the ingredient mixture. While some compositions refined easily others gave difficulty. It was surprisingly found that the addition of part of the lecithin, typically one third, at this stage rather than later rendered such mixtures easier to refine. Moreover the addition of lecithin at this stage gave no processing or other problems whether the chocolate was subsequently processed by extrusion or by traditional conching.

Variations of the lower calorie chocolate composition of the present invention have been examined. In particular the source of low fat milk powder was changed. In most formulations skim milk powder was used, but when this was replaced partially or wholly by a high protein milk powder a lighter and more aerated structure was observed after extrusion. The chocolate also had an improved taste and mouthfeel.

It has further been found that the milk chocolate composition of the present invention can be easily further aerated by injecting an inert gas, such as carbon dioxide, nitrogen, or a mixture thereof, under pressure into the mixture. Such further aeration is particularly effective when a high protein milk powder is used and the resulting chocolate structure is entirely unlike traditional milk chocolate and is highly expanded. The mouthfeel of this expanded chocolate showed no trace of stickiness, "balling" in the mouth or dryness, and it cleared as easily and as quickly from the palate as traditional chocolate.

The proportion of protein in the high protein milk powder is not critical and can be from 50 to 90% by weight.

A less complex way of giving a light texture to the lower calorie chocolate of the present invention is by using the well known flake process described by Minifie in his aforementioned text book, among others. However, the traditional teaching (see Minifie at p.187) is that refiner paste for flake should have a higher fat content than for normal chocolate manufacture. The lower calorie chocolate of the present invention has a lower fat content than normal chocolate and so it was surprising that it could successfully be made into flake by the traditional process. It is not certain why this should be possible, but the high proportion of the fat as cocoa butter and milk fat in the composition of the invention may be an important factor. The mouthfeel of the flake was similar to that of the aerated chocolate described above in that it showed no trace of stickiness, "balling" in the mouth or dryness, and it cleared as easily and as quickly from the palate as traditional chocolate.

Some embodiments of the present invention will now be described in the following Examples, in which the starting composition of the lower calorie milk chocolate composition according to the invention is as set out in Tables I and II below. In these Tables, the composition of a conventional sugar-based milk chocolate composition is also given by way of comparison.

In the following Examples the ingredient polydextrose was the commercially available product sold by Pfizer Inc. under the trade designation "POLYDEXTROSE FCC".

TABLE I

|  | Regular Milk Choc. % | Lower Calorie Milk Choc. % | Calorie Content (kcal/g) |
| --- | --- | --- | --- |
| Protein | 8 | 8 | 4 |
| Fat | 1 | 26 | 9 |
| Sugar | 45 | — | 4 |
| Other carbohydrate | 10 | 9 | 4 |
| Polydextrose | — | 26 | 1 |
| Lactitol | — | 24 | 2.4 |
| Non-caloric constituents | 6 | 7 | — |
|  | 100 | 100 |  |
| Calorie content (kcal/100 g) (approx.) | 531 | 386 | — |

TABLE II

|  | Regular Milk Choc. % | Lower Calorie Milk Choc. % |
| --- | --- | --- |
| Sugar | 45 | — |
| Polydextrose | — | 26 |
| Lactitol | — | 24 |
| Cocoa liquor | 13 | — |
| Cocoa powder (12% fat) | — | 10 |
| Cocoa butter | 17.5 | 17 |
| Wholemilk powder | 19 | — |
| Low fat skim milk powder (1% fat) | 3 | 15 |
| Butter fat | — | 7 |
| Hazelnut paste | 2 | — |
| Lethicin | 0.5 | 0.5 |
| Aspartame/flavouring | — | 0.5 |
|  | 100.0 | 100.0 |

EXAMPLE 1

The ingredients of the lower calorie milk chocolate recited in Table II were weighed to provide a 25 kg batch and a premix of the low fat cocoa powder and the milk powder was prepared using a turbomixer. A second premix of lecithin and two thirds of the cocoa butter was prepared using a conical jacketed mixer after melting of the cocoa butter. The butterfat and the other ingredients were left to be added separately without premixing.

For the conching of the composition, a Clextral BC 45 twin screw extruder was used having seven stages each temperature controllable. The screw speed was adjusted to between 100 and 120 rpm.

The controlled operating temperatures of the seven sections of the extruder were, in order, 81° C., 84° C., 63° C., 65° C., 59° C., 58° C. and 52° C. In the first stage the first premix was introduced into the extruder with one third of the cocoa butter, and these ingredients were mixed and kneaded. In the second stage further kneading took place before the mixture was degassed at the third stage. At the fourth stage the butterfat was added with the application of slight shear, whilst at the fifth stage all of the remaining ingredients were introduced namely the second premix of the lecithin and the remaining two thirds of the cocoa butter and, as a separate stream, the polydextrose, lactitol, aspartame and the flavouring which in this case were salt, aroma and vanilline.

It will be noted that prior to the addition of the lactitol and polydextrose, the kneading, rolling and shearing of the initial paste took place with increasing intensity with temperature allowed to rise to over 80° C., but that after degassing and the addition of these ingredients the temperature was maintained at below 60° C. in order to avoid any release of the water of crystallisation therein. At stages 5 and 6 the chocolate paste was subjected to shear and increasing mechanical pressure before final mixing and cooling at the 7th stage prior to expulsion from the extruder.

Following tempering of the extruded chocolate mass in order to allow crystallisation of the fat components, it was then moulded, and a milk chocolate of satisfactory flavour, texture and mouthfeel was obtained.

EXAMPLE 2

Example 1 was repeated but with the following changes. First the addition of the lactitol-containing stream being added at the first stage along with the cocoa powder and the milk powder, rather than at the fifth stage. Second two thirds of the cocoa butter was added at the first stage and one third at the fifth stage, rather than the other way round. The temperature of the extruder was then controlled so that at no time did the paste reach a temperature in excess of 45° C. The controlled temperatures of the seven stages were, in sequence, 39° C., 45° C., 34° C., 33° C., 39° C., 40° C. and 33° C. Again, the screw speed was adjusted to between 100 and 120 rpm with degassing at the 3rd stage. The mechanical actions effected in stages 1 to 3 were as in Example 1, but in stages 4 and 5 the mechanical pressure was increased followed by the application of slight shear in stage 6 with cooling in stage 7 prior to expulsion of the mass from the extruder.

Again after tempering and moulding, a milk chocolate of satisfactory flavour, texture and mouthfeel was produced.

EXAMPLE 3

The ingredients of the lower calorie milk chocolate recited in Table II were weighed to provide a 25 kg batch and all of the chocolate ingredients except lecithin and a small amount of butterfat were mixed together and the mass finely milled in a five roll refiner as used conventionally for sugar-containing chocolate. This refined mass was metered into the first stage of the extruder with the remaining lecithin and butterfat. Here, in contrast to Examples 1 and 2, there was no dry conching and degassing took place at stage 5 not stage 3. The controlled temperatures of the seven stages were in sequence 47° C., 49° C., 51° C., 52° C., 48° C., 51° C. and 47° C. In stage 1 mixing and kneading was followed by further kneading in stages 2–4 until the mass was plasticised. Degassing in stage 5 was followed by kneading in stage 6 with final kneading and cooling in stage 7. The screw speed was 500 rpm.

Again after tempering and moulding a milk chocolate of satisfactory flavour, texture and mouthfeel was produced.

EXAMPLE 4

The ingredients of the lower calorie milk chocolate recited in Table II were altered such that the skim milk powder was replaced by a high protein, low fat milk powder (protein 75%, fat 1%, lactose 11%). The method of manufacture was identical with that of Example 3.

A batch of 10 kg stirred chocolate made as above at 47° C. was injected with carbon dioxide at 7 bar for 10 min. The mix was then cooled to about 40° C. to 41° C. and moulded. After cooling to about 11° C. for about 25 min. it could be easily demoulded. The chocolate was entirely unlike traditional chocolate and was highly expanded. In addition the texture and mouthfeel of the chocolate was exquisitely light, showing no trace of stickiness, "balling" in the mouth or dryness. Moreover it cleared as easily and as quickly from the palate as traditional chocolate.

EXAMPLE 5

The ingredients of the lower calorie milk chocolate were as recited in Table II and the method of manufacture of the chocolate was identical with that of Example 3.

A batch of 12 kg chocolate made as above was loaded into a Conomix vessel, warmed to 43° C. with stirring, and carbon dioxide at 8 bar injected for 8 minutes. The mass was then tempered by cooling to 29° C., moulded and cooled to 11° C. before demoulding.

The chocolate was highly expanded and light in texture and mouthfeel. It also showed no trace of stickiness, "balling" in the mouth or dryness, and it cleared as easily and as quickly from the palate as traditional chocolate.

EXAMPLE 6

The ingredients of lower calorie milk chocolate recited in Table II were weighed to provide a 3 kg batch. All ingredients except cocoa butter, butterfat and lecithin were added to a mixer and then one fifth of the cocoa butter and the butterfat and one third of the lecithin were added. Mixing was continued until a homogeneous mass was obtained. It was then refined using a three roll refiner to a particle size of 20–25 microns. The refined mass was transferred to a 5 kg capacity conche and kneaded for 30 minutes at 55° C. The remaining cocoa butter, butterfat and lecithin were added and conching resumed for a further three hours. The conched mass was then tempered, moulded, cooled to 11° C. and then demoulded.

A milk chocolate of satisfactory flavour, texture and mouthfeel was produced.

By varying the ingredients and adjusting their proportion, a wide range of sugar-free milk chocolate can be produced of a reduced calorie content, including a lower calorie milk chocolate, as compared with conventional sugar-based milk chocolate.

It will be understood that the present invention applies not only to chocolate meeting current legislation which limits the total fat content to a minimum of 25%, but also to imitation chocolate formulations of a fat content lower than 25%.

We claim:

1. A milk chocolate composition made from an admixture of a cocoa component, a milk component and a sweetener component, wherein the cocoa component comprises cocoa butter and cocoa powder, the milk component comprises low fat milk powder and butterfat, and the sweetener component comprises a sugar alcohol, wherein a total fat content of the composition is less than about 30% by weight, of which at least 75% by weight is made up of an aggregate of cocoa butter and butterfat.

2. A composition as claimed in claim 1 wherein the total fat content of the composition is about 25% by weight, of which at least 80% by weight is made up of the aggregate of cocoa butter and butterfat.

3. A composition as claimed in claim 1 wherein a weight ratio of cocoa butter to butterfat is from 2:1 to 5.5:1.

4. A composition as claimed in claim 1 including an edible carbohydrate having a metabolizable calorie content less than that of sugar.

5. A composition as claimed in claim 4 wherein the carbohydrate is polydextrose.

6. A composition as claimed in claim 1 having a calorie content of less than 530 kcal per 100 grams.

7. A composition as claimed in claim 6 having a calorie content of less than 400 kcal per 100 grams.

8. A composition as claimed in claim 1 including an intense sweetener.

9. A composition as claimed in claim 1 including at least one of an emulsifier and a flavouring agent.

10. A composition as claimed in claim 9 wherein the or one of the emulsifiers is lecithin.

11. A method for making milk chocolate from a composition made from an admixture of a cocoa component, a milk component and a sweetener component, wherein the cocoa component includes cocoa butter and cocoa powder, the milk component includes low fat milk powder and butterfat, and the sweetener component includes a sugar alcohol, wherein a total fat content of the composition is less than about 30% by weight, of which at least 75% by weight is made up of an aggregate of cocoa butter and butterfat, comprising the step of:

intimately mixing together the cocoa component, the milk component and the sweetener component at a temperature of less than 60° C.

12. A method as claimed in claim 11 wherein the mixing temperature is less than 45° C.

13. A method as claimed in claim 11 wherein the components are added and intimately mixed sequentially in the form of at least two premixes, the first of which premix contains some, but not all, of the cocoa butter and/or butterfat.

14. A method as claimed in claim 11 wherein all of the cocoa butter and butterfat is mixed with at least some of the other ingredients at the, or a first, mixing stage.

15. A method as claimed in claim 11 wherein the composition is subjected to a refining stage.

16. A method as claimed in claim 15 wherein the composition includes lecithin and wherein a proportion of the lecithin is added prior to the refining stage.

17. A method as claimed in claim 11 wherein the mixing is effected continuously in a rotary extruder which includes means for controlling the temperature of the mixture being extruded therethrough, means for removing gasses from the mixture during extrusion, and means for preventing ingress of moisture during extrusion.

18. A method as claimed in claim 17 wherein the extruder is a twin screw extruder.

19. A method as claimed in claim 11 including the step of injecting an inert gas into the mixture.

20. A method as claimed in claim 11 including the step of forming the composition into a flake chocolate.

* * * * *